United States Patent Office 3,749,737
Patented July 31, 1973

3,749,737
POLY(HYDROXYARYLPOLYMETHYLENESULFO-
NIUM) ZWITTERIONIC MONOMERS AND SUR-
FACE COATINGS THEREFROM
Melvin J. Hatch, Socorro, N. Mex., and Donald L. Schmidt and Hugh B. Smith, Midland, Mich., assignors to The Dow Chemical Company, Midland, Mich.
No Drawing. Continuation-in-part of application Ser. No. 866,762, Oct. 15, 1969. This application Dec. 7, 1971, Ser. No. 205,754
Int. Cl. C07d 63/04, 65/04
U.S. Cl. 260—332.3 R 10 Claims

ABSTRACT OF THE DISCLOSURE

Poly(hydroxyarylpolymethylenesulfonium) salts of Formula I:

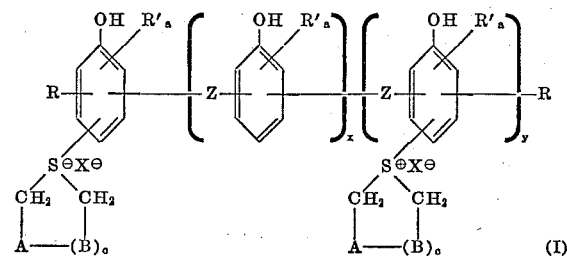

where Z is —C($C_1$-$C_4$ alkyl)$_2$— and $\Sigma(x+y)=1$, are prepared by condensation of a polynuclear phenol with a cyclic sulfide. These salts can be converted into a cyclic sulfonium hydroxide inner salt or zwitterionic monomer (II). These reactive cyclic sulfonium zwitterion monomers thermally polymerize to yield water-insoluble, thermoset resins useful as adhesives, coatings, films, and impregnants. Applied to nonporous surfaces, such as glass and wire, hard surface coatings with high impact resistance coupled with good water and chemical resistance are obtained.

BACKGROUND

This application is a continuation-in-part of U.S. application S.N. 866,762 filed Oct. 15, 1969 now U.S. Pat. No. 3,660,431.

The thermal lability of many sulfonium salts is recognized. Hatch Canadian Pat. 708,230 and British Pat. 960,029 describe film-forming compositions containing a sulfonium binder which on heating forms a water-insoluble film. Lloyd U.S. Pat. 3,409,660 and Kangas U.S. Pat. 3,322,737 use sulfonium salts as fugitive surfactants and stabilizers in thermally curing latex systems.

In the thermal polymerization of certain sulfonium carboxylate salts disclosed by Hatch, the condensation of the monomeric salt containing an equal number of positive and negative sites yields a polyester and by-product sulfide such as the classical "nylon salt" polymerization yields a polyamide and water. As in the nylon polymerization, by-product sulfide normally requires special processing for complete removal from the product.

STATEMENT OF THE INVENTION

A new class of poly(hydroxyaryl cyclic sulfonium) salts has been discovered which form reactive inner hydroxide salts or zwitterions. These cyclic sulfonium zwitterions, containing an equal number of positive and negative charge sites, are very reactive monomers. They thermally polymerize without sulfide by-products, the sulfur and attached organic groups becoming part of the polymer structure. With an average of more than one cyclic sulfonium zwitterion per monomer unit (mer.), cross-linked polymer resins are obtained.

More specifically, new poly(hydroxyarylpolymethylene sulfonium) salts having Formula I have been prepared and used to synthesize poly(thydroxyarylpolymethylene sulfonium)zwitterionic monomers having Formula II, i.e.:

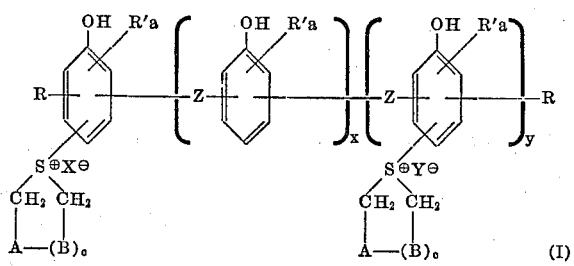

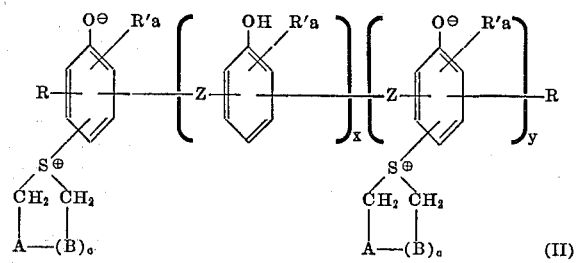

where each R individually is H, Cl, Br, OH, or —O$C_1$-$C_4$ alkyl,
each R' individually is H, Cl, Br, or $C_1$-$C_4$ alkyl and $a$ is 1 or 2;
each sulfur is ortho or parato a phenolic oxygen,
each A and B individually are —CH$_2$— or —CHR'— and $c$ is 1 or 2, and
X is a nonbasic inorganic anion; and
Z is —C($C_1$-$C_4$ alkyl)$_2$— and $\Sigma(x+y)=1$.

Preferably X$^{\ominus}$ is the anion of a strong inorganic acid such as Cl$^-$, Br$^-$, HSO$_4^-$, and HClO$_4^-$.

The zwitterionic monomers (II) thermally polymerize to yield solid polymers containing as an essential element a plurality of oxyarylthioalkylene groups having Formula III:

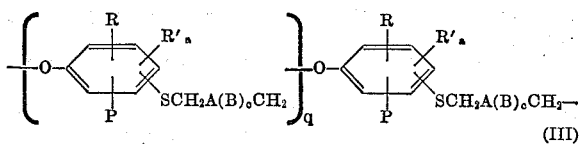

where P is the remainder of the polyarylphenol monomer (II), the other groups are as defined above, and $q$ is at least one.

When the zwitterionic monomer (II) contains an average of more than one cyclic sulfonium group per molecule, cross-linking occurs through additional oxyarylthiomethylene groups. Hard surface coatings with high impact resistance are obtained by applying the polycyclic sulfonium monomer (II) to a substrate surface and thereafter heating to obtain a water-insoluble cross-linked coating.

GENERAL DESCRIPTION

Poly(hydroxyaryl cyclic sulfonium) salts (I)

These poly(hydroxyaryl cyclic sulfonium) salts are prepared from polynuclear phenols such as bisphenol, di(hydroxyphenyl)ether, di(hydroxyphenyl)sulfide, bis(o-hydroxyphenyl) $C_1$–$C_4$ alkylene glycol ether, and phenol-formaldehyde resins by processes such as follows:

(IA)

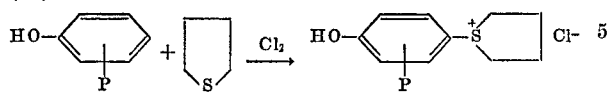

(IB)

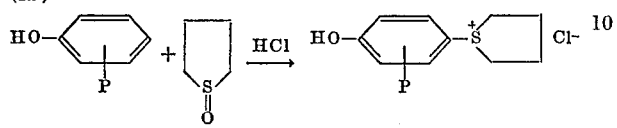

where P is the remaining portion of the phenolic monomer.

These processes require that the phenol reactant have at least one active ortho or para hydrogen per intended sulfonium group. Strong electron-withdrawing substituent groups, such as halogen, carboxylate and nitro, deactivate the polyphenol and cause poor yields. Thus, the haloaryl sulfonium salts are preferably prepared by direct halogenation of the sulfonium salt.

Hydroxyaryl sulfonium salts having an average of 1 or less sulfonium groups per molecule normally yield soluble, essentially linear polymer. With an average of more than 1 sulfonium group per molecule, cross-linking and insolubilization occur during the subsequent polymerization.

Process IA is carried out in the dark at a reduced temperature, such as −40° to −10° C., and gives moderate yields of the polyphenolic cyclic sulfonium chloride. At lower temperatures, yields are improved by adding anhydrous HCl to the tetramethylenesulfide prior to adding the polyphenol and $Cl_2$.

In process IB, a polynuclear phenol and tetramethylenesulfoxide condense in the presence of a strong anhydrous acid such as HCl. Methanol can be used as a solvent. Low temperatures and a Lewis acid catalyst such as $AlCl_3$, $SO_2$, etc., are useful in minimizing side reactions and improving color.

By appropriate choice of reactants, process, and process conditions, a wide variety of poly(hydroxyaryl cyclic sulfonium) salts can be prepared.

Typical polynuclear phenol reactants include bisphenols, such as methylenebis(phenol) and isopropylidenebis(phenol), di(hydroxyphenyl)ether, di(hydroxyphenyl)sulfide, bis ethers and esters of catechol and resorcinol with $C_1$–$C_6$ alkylene glycols and $C_2$–$C_8$ dicarboxylic acids. Useful sulfides and sulfoxides include tetramethylenesulfide, tetramethylenesulfoxide, pentamethylenesulfide, and pentamethylenesulfoxide.

The cyclic sulfonium salts with a nonbasic inorganic anion such as chloride or bromide, are generally stable, solid salts at room temperature, soluble in polar hydroxylic solvents such as water, methanol and isopropanol. Stable hydrates have been isolated of some salts. Illustrative of their chemical stability is the chlorination of the bissulfonium salt of isopropylidenebisphenol with chlorine to yield a chlorinated sulfonium salt.

Purification of the salts can be achieved by crystallization from a mixed solvent such as methylene chloride-methanol, conversion into an insoluble salt, e.g., sulfate or perchloroate, or precipitation from aqueous solution with a precipitant diluent such as dioxane, tetrahydrofuran, or higher alcohol.

Poly(hydroxyaryl cyclic sulfonium) zwitterionic monomers (II)

Conversion of the sulfonium salt (I) into the reactive, sulfonium hydroxide inner salt or zwitterionic monomer (II) is achieved by known methods. Ion-exchange with an anion-exchange resin in hydroxide form is particularly suitable. For some salts, direct treatment with a strong inorganic base in a solvent such as anhydrous alcohol in which the by-product inorganic salt has limited solubility is preferred.

Isolation of the crystalline zwitterionic monomer from solution is complicated by polymerization as the solvent is removed. However, stable crystalline hydrates have been isolated in some cases. The structural identity of the zwitterionic monomers has been confirmed by spectrographic analyses.

For many applications the zwitterionic monomer is advantageously used in solution. Thus, the monomer can be applied to a surface as an aqueous solution. Evaporation of the solvent yields a partially polymerized film that can be cured by further heating to a hard, resilient coating.

Polymerization

Thermal polymerization of the poly(hydroxyaryl cyclic sulfonium) zwitterionic monomer (II) is a facile reaction involving attack of a phenolic anion on a methylene carbon adjacent to the sulfonium group in the cyclic sulfonium ring with cleavage of the ring and formation of a polymer having a plurality of moieties of Formula III, e.g.,

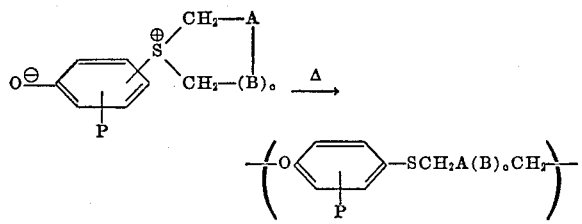

where P is the remaining portion of the phenolic monomer. As in other condensation polymerization, essentially linear polymers are obtained from zwitterionic monomers containing about 1 sulfonium zwitterion per molecule. With an average of more than 1 sulfonium zwitterion per molecule, cross-linking and insolubilization are obtained during polymerization.

Copolymers are prepared from mixtures of sulfonium zwitterionic monomers including the switterionic monomers derived from mono(hydroxyarylcyclic sulfonium) salts described by Hatch, Yoshimine, Smith and Schmidt in U.S. application S.N. 866,763 filed Oct. 15, 1969 and now U.S. Pat. No. 3,636,052. By appropriate choice of reactants, copolymers can be obtained with varied degrees of cross-linking, thus permitting modification of the hardness, flexibility, resilience, and other important physical properties of the polymers.

Although some polymerization may occur at room temperature, differential thermal analysis reveals a major polymerization exotherm for the switterionic monomers between about 40°–100° C. Thus, rapid polymerization is generally obtained by heating at about 40°–200° C. Particularly in coating applications, it is often desirable to achieve partial polymerization as the solvent is evaporated at 20°–100° C. and then a final cure by heating for a short time at a higher temperature, preferably about 80°–150° C.

Higher molecular weight polymers are normally obtained by polymerizing in the absence of oxygen. In some instances, addition of a nucleophilic amine initiator increases the polymer molecular weight.

The thermal polymers typically have glass transition temperatures between about 30°–110° C. and decomposition temperatures greater than 300° C. as determined by differential thermal analysis. The polymers also have good water and solvent resistance.

Films and coatings

The thermal polymers of the poly(hydroxyaryl cyclic sulfonium)zwitterionic monomers (II) described herein are particularly useful as adhesives, impregnants, coatings and films when the zwitterion monomer can be applied to the substrate or cast from solution and thereafter dried and polymerized in situ. Such coatings can be applied to nonporous surfaces, such as glass and metals, in many forms including sheets, films, wires, filaments, beads, etc., to give strong, durable, protective surface coatings by simple and conventional methods, including paper and other cellulosic products, textile goods, wood, etc., can also be impregnated or coated with a solution of the sulfonium zwitterionic monomer by standard techniques followed by in situ thermal curing.

Since the sulfonium zwitterionic monomers are very soluble in water and other polar solvents, e.g., 50–70% by weight, relatively thick coatings are easy to obtain. When desired, appropriate pigments and other coating additives can be incorporated in the monomer solution and then fixed in the coating during polymerization. Other advantages arise from the strong adherence of these polymers to the substrate surface and the short curing times required.

The following examples illustrate further the present invention. Unless otherwise stated, all parts and percentages are by weight.

EXAMPLE 1

Bisphenol tetramethylene sulfonium switterionic monomers (A) Anhydrous HCl was passed for 90 minutes through a solution of 50 pts. (0.22 mole) bisphenol A (4,4'-isopropylidenebisphenol) and 50 pts. (0.48 mole) tetrahydrothiophene oxide in about 570 pts. refluxing liquid $SO_2$ (B.P. $-10°$ C.). Evaporation of the $SO_2$ gave a gummy product which was triturated with ether and a solid sulfonium salt recovered.

The bisphenol tetramethylene sulfonium chloride was dissolved in anhydrous methanol and an equivalent of 1 N $NaOCH_3$ in methanol added. The resulting mixture was cooled, the precipitated NaCl removed by filtration, and then the filtrate was concentrated under reduced pressure to yield 72 pts. (90% yield on bisphenol A) of a solid tetramethylene sulfonium zwitterionic monomer containing an average of 1.58 sulfonium groups per molecule.

*Analysis.*—Calcd. for $C_{15}H_{13}A_2 \cdot 1.58(C_4H_8S) \cdot 0.5H_2O$ (percent): C, 69.63; H, 7.07; S, 13.77. Found (percent): 67.1; H, 7.30; S, 13.77.

(B) In a similar manner, 1 mole of tetrahydrothiophene oxide was condensed with 1 mole of o,p'-bisphenol A. The monosulfonium chloride salt was recovered as a partial hydrate. Calcd. for $C_{14}H_{23}ClO_2S \cdot 0.3H_2O$ (percent): C, 64.07; H, 6.65; Cl, 9.95; O, 10.33; S, 9.00. Found (percent): C, 64.10; H, 6.62; Cl, 9.90; S, 9.94. Treatment with sodium methoxide gave the monocyclic sulfonium zwitterion monomer.

(C) Condensation of 1 mole tetrahydrothiophene oxide with 1 mole p,p'-bisphenol A gave a different monocyclic sulfonium chloride salt. Calcd. for $C_{14}H_{23}ClO_2S$ (percent): C, 72.57; H, 7.05; S, 10.20. Found (percent): C, 72.50; H, 7.15; S, 10.16.

A detailed NMR analysis of the bisphenol derivatives confirmed structures:

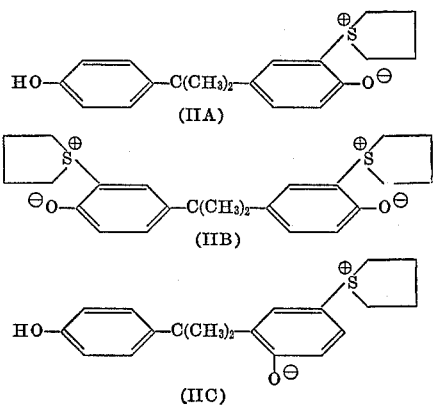

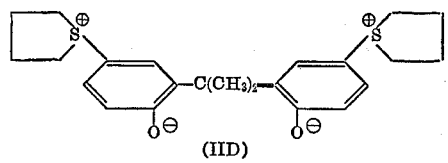

1A is a mixture of about 45% IIA and 55% IIB.

(D) A portion of the bisphenol A sulfonium zwitterionic monomer of Example 1A was chlorinated in the dark by adding chlorine to the stirred solution in acetic acid at 20°–35° C. for about 1.25 hours. The recovered chlorinated monomer contained an average of about 1–3 chlorine atoms per molecule depending on the amount of chlorine added. Although the sulfonium group deactivate the hydroxyaryl ring to which it is attached, a portion of the chlorine is substituted on the same ring as determined by spectral analyses.

(E) Similarly, other polynuclear phenol tetramethylene sulfonium zwitterionic monomers were obtained from 4,4'-isopropylidene-bis-o-cresol and 2-isopropylidene(4"-hydroxyphenyl) - 4,4'-isopropylidenebisphenol containing an average of more than 1.0 sulfonium groups per molecule.

The IR and NMR spectra of these sulfonium salts and zwitterionic monomers were consistent with the structural Formulas I and II, e.g.:

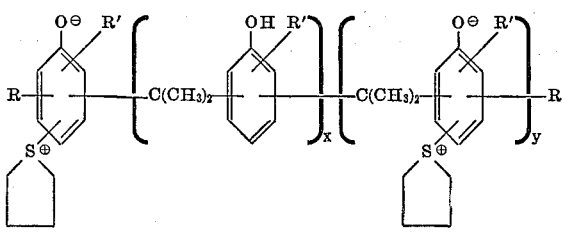

where R and R' individually are H, Cl, or $CH_3$, and $\Sigma(x+y)=1$.

EXAMPLE 2

Polymerization of the poly(hydroxyaryl)tetramethylene sulfonium zwitterionic monomers The sulfonium zwitterionic monomers of Example 1 polymerize when heated at about 40°–200° C. Typically the differential thermal analysis (DTA) curve of a biscatechol trimethylene ether sulfonium monomer showed a polymerization exotherm between about 60°–100° C. The resulting polymer had DTA endotherms at 50° and 350° C. corresponding to the glass transition temperature, $T_g$, and the decomposition temperature.

In some instances, the zwitterionic monomers could not be isolated in crystalline form at room temperature because of polymerization as the solvent is removed.

Applied in solution to a surface and then dried and heated, these poly(hydroxyaryl)tetramethylene sulfonium zwitterionic monomers yield water-resistant coatings. Cross-linking occurs with an average of more than 1 sulfonium zwitterion group per molecule to yield hard coatings.

EXAMPLE 3

Coatings from bisphenol tetramethylene sulfonium zwitterionic monomers (A) Coatings of the bisphenol cyclic sulfonium monomers of Example 1 were applied to ⅟₃₂" steel panels by standard techniques using aqueous or methanolic solutions containing 50–70% of the zwitterionic monomer. The solvent was evaporated at 20°–70° C. yielding a clear partially polymerized film that would not redissolve in water or methanol. The films were then cured at 80°–120° C. for 1–2 hours to yield hard coatings. Because of the crystallinity of the zwitterionic monomer of bisphenol A, coatings from this monomer were grainy. Partial chlorination of the bisphenol A monomer gave a monomer that formed very smooth coatings with increasing hardness with increasing degree of chlorination.

(B) Copolymers were also prepared from mixtures of the bisphenol sulfonium monomers and 4-hydroxyphenyl, 3-methyl-4-hydroxyphenyl or 3,5-dichloro-4-hydroxyphenyl tetramethylene sulfonium zwitterionic monomers. As the amount of monosulfonium monomer increased, the coatings became more flexible and adherent.

(C) Typical test data for several 1.5 mil bisphenol sulfonium based polymer and copolymer coatings on $\frac{1}{32}''$ steel panels are given in Table 1.

TABLE 1.—COATED STEEL PANELS

| Number | Polyphenol [a] | Hardness [b] | Impact, in.-lbs. | Elongation,[c] percent |
|---|---|---|---|---|
| 1 | CBA_J_____g_____ | 30–38 | 10–50 | |
| 2 | 66% CBA+34% DCP | 20 | 160 | >32 |
| 3 | 72% CBA+28% DCP | 23 | 160 | >32 |
| 4 | 84% CBA+16% DCP | 24 | 160 | >32 |
| 5 | 100% BA | 27 | 160 | <32 |
| 6 | 67% BA+33% Cr | 16.5 | 160 | >32 |

[a] CBA=chlorinated bisphenol A; DCP=3,5-dichlorophenol; BPA=bisphenol A; Cr=ortho-cresol.
[b] Kentron-Knoop hardness, ASTM Method D-14174-62T.
[c] ASTM Method D-522-60.

(D) The chemical and salt spray resistance of these polymers is good and their acid resistance is superior to conventional epoxy resin systems.

Further advantages accrue from the ability of these polymer coatings to be applied from aqueous solutions of high solids content and low viscosity and from the short curing times. The coatings have excellent adherence to clean surfaces of metal, wood, paper, plastics including polyethylene, polystyrene, polyurethane, etc. in the form of films, sheets, wire, solid castings, foamed products, etc. Their superior hardness and high impact and scratch resistance are important properties for many applications.

We claim:

1. A poly(hydroxyarylpolymethylene sulfonium) salt having Formula I:

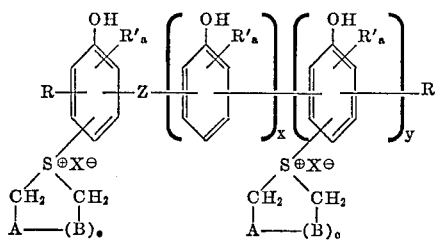

where
each R individually is H, Cl, Br, OH, or —OC$_1$-C$_4$ alkyl,
each R' individually is H, Cl, Br, or C$_1$-C$_4$ alkyl and $a$ is 1 or 2;
each sulfonium group is ortho or para to a phenolic oxygen,
each A and B individually are —CH$_2$— or —CHR'— and $c$ is 1 or 2;
X is an acidic inorganic anion, and
Z is —C(C$_1$-C$_4$ alkyl)$_2$— and $\Sigma(x+y)=1$.

2. The sulfonium salt of claim 1 where —A—(B)$_c$— is —CH$_2$CH$_2$—.

3. The sulfonium salt of claim 1 where Z is

—C(CH$_3$)$_2$—.

4. The sulfonium salt of claim 1 where X$^\ominus$ is an anion of a strong inorganic acid.

5. The sulfonium salt of claim 1 having the formula:

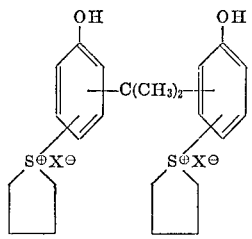

6. A soluble poly(hydroxyarylpolymethylene sulfonium) zwitterionic monomer having Formula II:

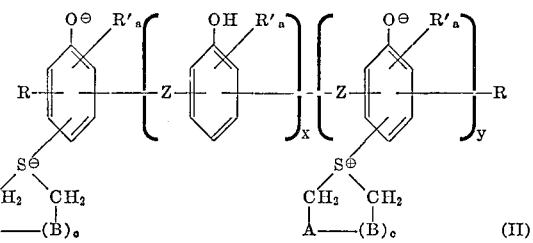

where each R individually is H, Cl, Br, OH, or —OC$_1$-C$_4$ alkyl,
each R' individually is H, Cl, Br, or C$_1$-C$_4$ alkyl and $a$ is 1 or 2;
each sulfonium group is ortho or para to a phenolic oxygen,
each A and B individually are —CH$_2$— or —CHR'— and $c$ is 1 or 2,
Z is —C(C$_1$-C$_4$ alkyl)$_2$— and $\Sigma(x+y)=1$.

7. The cyclic sulfonium zwitterionic monomer of claim 6 where —A—(B)$_c$ is —CH$_2$CH$_2$—.

8. The cyclic sulfonium zwitterionic monomer of claim 6 where Z is —C(CH$_3$)$_2$—.

9. The cyclic sulfonium zwitterionic monomer of claim 6 having the formula:

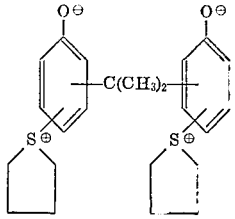

10. The cyclic sulfonium zwitterionic monomer of claim 6 having the formula:

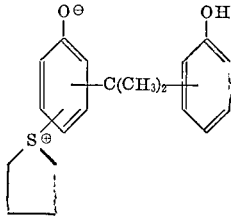

References Cited

UNITED STATES PATENTS 3,636,052   1/1972   Hatch et al. _____ 260—332.3
3,660,431   5/1972   Hatch et al. _____ 260—332.3

HENRY R. JILES, Primary Examiner
C. M. JAISLE, Assistant Examiner

U.S. Cl. X.R.

260—47, 327 TH; 117—128.4, 132, 148, 155, 161